United States Patent Office 3,217,830
Patented Nov. 16, 1965

3,217,830
ADHESIVE COMPOSITION AND PLASTIC FILM COVERED FIBERBOARD PRODUCTS PRODUCED THEREWITH
Robert J. Hoelzer, Westfield, N.J., assignor to Allied Chemical Corporation, New York, N.Y., a corporation of New York
No Drawing. Filed Dec. 13, 1962, Ser. No. 244,284
18 Claims. (Cl. 181—33)

This invention relates to adhesives and more particularly to new and improved adhesive material activatable at high temperatures to form moisture resistant, lasting bonds of high strength between fiberboard and synthetic plastic sheet or film. It also relates to manufacture of the adhesive material and to improved plastic film covered fiberboard products having heat-formed rigid plastic film integrally bonded to fiberboard by such adhesive.

Of recent interest has been a line of products in which a porous fiberboard body is covered with a thin sheet or film of a synthetic plastic material. The plastic film is commonly embossed or imprinted for decorative effect and may be joined to the fiberboard in a number of ways including friction holding, adhesive bonding, heat sealing or by various fastening means. A specific example of such a product is a plastic film covered acoustical ceiling tile. By joining the plastic film tightly at only the margnal edges of the tile it has been found that the thin plastic sheet will act as a membrane improving acoustical value. More recently it has been found that high quality products of this type could be produced efficiently on a commercial scale by heat-forming the plastic film over the marginal portions of the fiberboard base while in the same operation joining the plastic film to the edge portions with an adhesive material. In such an operation the adhesive material would first be deposited along the marginal edges of the normally exposed surface. The fiberboard base is then covered with the film of plastic material and heat directed to the marginal portions to more or less simultaneously conform the plastic film to the marginal portions and effect the adhesive bond. The process of this type found to be particularly expeditious for practical operation is that of vacuum-forming in which the overlying plastic material is subjected to vacuum pressure and high radiant heat to rapidly conformn the plastic sheet while simultaneously radiant heat acts on the underlying adhesive material to bond the plastic film to the fiberboard base. In the production of these products such as the plastic film covered acoustical tiles the adhesive material is deposited continuously around the marginal portions of the tile, usually on narrow beveled edges at which the normally exposed surface of the fiberboard terminates. The tile is then transferred to the bed of the vacuum forming apparatus, customarily after heat conditioning of the fiberboard to control moisture content. A sheet of thin rigid plastic material is disposed over the tile and secured between clamping frames surrounding the vacuum bed to provide an air-tight area beneath the plastic film. In the better forms of practice a slight vacuum is first applied to draw the plastic film against the tile. An overhead radiant heater adapted to provide varying temperatures between about 300° F to 1300° F. is then turned on to an intermediate temperature to initially soften the plastic material covering the edges of the fiberboard base. A strong vacuum is then applied and the softened plastic material drawn over the edges of the tile and conformed thereto while simultaneously the radiant heater temperature is increased to the higher ranges of the order of about 800 to 1200 F. to rapidly activate the underlying adhesive material. In this manner the total heat and vacuum time required may be of the order of only about 5 to 20 seconds permitting efficient mass production of the plastic film covered fiberboard products. After cessation of the heating period the assembly is cooled, usually with the aid of circulating air while maintaining the vacuum to set the adhesive and complete the bond between the plastic film and fiberboard base.

The adhesive material required for the heat and vacuum forming method of manufacture is of the heat-activatable type. Such adhesives have been long known and many varieties available commercially. It appeared that simple testing among the commercially available products would be all that was required to find an adhesive material satisfactory for the purpose but this was found not to be the case. Representative types of available heat-activatable products were selected and investigated for use in the operation but were found to be deficient in one respect or another. Other available adhesives were then tried but it was found that the materials failed to satisfy all desired requirements for the purpose. Certain of the adhesive materials which were tried failed to even survive the usual fiberboard conditioning operation in the drying oven in which the tiles were heated at temperatures of around 375° F. for about 10 minutes. Other heat-activatable adhesive materials after exposure to the high radiant conditions on the vacuum forming machine failed to give any bond between the fiberboard and the plastic film. Still others which retained their adhesive properties provided a very weak bond or a bond which remained effective for only a short time. It was also found that some adhesive materials gave relatively good bonds which were apparently lasting but which when placed in ordinary use under normal temperature and humidity conditions were found to be complete failures.

An object of the present invention is to provide a new and improved heat-activatable adhesive. Another object is to provide an adhesive material activatable at high temperatures by radiant heat to form moisture-resistant lasting bonds of high strength between fiberboard and synthetic plastic material. A further object is to provide an adhesive material for bonding fiberboard and synthetic plastic film material in a manner capable of withstanding high temperature, high humidity conditions and normal stress placed on the bond under such conditions by ordinary expansion and contraction of the fiberboard. A further object is to provide for the manufacture of such themroplastic heat-activatable adhesive material. A still further object is to provide improved plastic film covered fiberboard products having heat-formed rigid plastic film integrally bonded to the fiberboard base by a relatively thin band of an adhesive material capable of forming a strong lasting bond between the plastic film and fiberboard.

When the available adhesive materials were found unsatisfactory experimentation was undertaken and continued during which over 100 different compositions were tried without success. Again, certain of the formulations were found to be inadequate after the fiberboard conditioning operation in the drying oven. Others, after it was attempted to join the fiberboard and plastic film under radiant heat were incapable of providing a bond. Still others, while apparently successful, produced weak bonds or bonds which later failed resulting in a complete separation of the plastic film from the fiberboard.

In accordance with the present invention it has been found that plastic film material is readily bonded to a porous fiberboard base by high temperature radiant heat to form strong lasting bonds by a highly specific heat-activatable adhesive composition comprising in aqueous emulsion about 200–300 parts, preferably 230–270 parts, by weight of a rubbery synthetic butadiene-acrylonitrile copolymer composed of 28–38%, preferably 32–36%, by weight acrylonitrile and 62–72%, preferably 64–68% by weight butadiene; about 100 parts by weight of a normally hard natural thermoplastic resin derived from hardwood and having a softening point by ASTM ring and ball of at least 100° C., preferably a pine wood resin having a softening point between about 105–125° C.; about 15 parts to less than 30 parts by weight, preferably 17–22 parts, of normally solid dicyclo-substituted phthalate, preferably diphenyl phthalate, and up to about 20 parts, preferably between 1–6 parts by weight, of a greaseless emulsifying agent, desirably selected from the group consisting of anionic and non-ionic detergents, preferably an anionic synthetic detergent; said adhesive composition having an initial viscosity of about 2000 to 6000 centipoises at 23° C., preferably an initial viscosity between about 3000 to 4000 centipoises at 23° C., and characterized by thinning on application of shearing forces.

The adhesive composition of the invention features a combination of the following particularly desired properties: (1) a heat-activatable material capable of forming strong, lasting bonds between porous fiberboard and synthetic plastic film material at high temperature; (2) an adhesive material activatable under particularly high temperature conditions by intense radiant heat without a loss or depreciation of adhesive properties; (3) a thixotropic material which is a relatively viscous material under normal conditions but convertible by original shearing forces to a thinner flowable material readily and easily applied to fiberboard but which either in the thinned state or under flow by radiant heat is resistant to substantial absorption by the fiberboard permitting efficient use of the material without loss of bonding due to such absorption; (4) an adhesive material essentially instantaneously actionable at high temperatures to form extremely strong durable bonds; (5) the adhesive in emulsion form may be heated at relatively high temperatures in the fiberboard conditioning oven whereby a substantial portion of water is removed from the emulsion and the adhesive correspondingly altered in viscosity, form and appearance without affecting bonding capacity on subsequent reheating after cooling to ambient temperature conditions; (6) a plasticized adhesive capable of bonding rigid, unplasticized, synthetic plastic film material in the softened state under high heat conditions without plasticization of the plastic film which causes loss of strength of the sheet at the bonding point; (7) the adhesive forms a bond which not only retains strength under high heat and humidity conditions but which is also capable of withstanding stress forces exerted against the bond by the plastic film under such conditions by the normal expansion and contraction of a fiberboard base to which the film is bonded by such adhesive.

The adhesive composition may be readily and conveniently produced by first heating, preferably with at least mild agitation, an aqueous emulsion of the thermoplastic wood derived resin to a temperature of at least about 60° C., preferably between 70° C. to 80° C., said emulsion prepared by emulsification of the finely divided wood derived resin with a material which acts as both an emulsifying agent for said resin and subsequently as a thickening agent to provide an adhesive composition having the desired viscosity, preferably ammonium caseinate, then adding slowly to said heated emulsion under rapid high shear agitation the molten normally solid dicyclo-substituted phthalate plasticizer to form a plasticized emulsion in which the finely divided resin is in intimate plasticized admixture with the dicyclo-substituted phthalate, rapidly cooling the resulting plasticized mixture to a temperature below about 35° C., preferably to a temperature between 20 to 30° C., and thereafter gradually admixing under controlled moderate agitation an aqueous emulsion of the butadiene-acrylonitrile copolymer containing a greaseless emulsifying agent selected from the group consisting of anionic and non-ionic synthetic detergents, said emulsion preferably containing an anionic synthetic detergent and being the same as that in which the butadiene-acrylonitrile copolymer was prepared. The adhesive composition so produced is a particularly uniform emulsion which is essentially elastomeric in character and readily thinning on application of shearing forces to a less viscous material of good flow characteristics.

The thermoplastic wood derived resin employed in the adhesive composition is a normally hard, brittle material having a softening point by ASTM ring and ball method of at least 100° C., preferably not exceeding about 150° C., and desirably in the range of about 105–125° C. It may be derived from natural hardwoods such as pine wood, preferably southern pine, by conventional heat and pressure distillation procedures for production of terpenes, rosins, and other natural chemical products. Where referred to herein such thermoplastic resin shall define a resin derived from hardwood and further characterized and constituted as set forth hereinbelow. The resin usually constitutes the aliphatic hydrocarbon insoluble fraction in contrast to the rosin materials which are soluble in the aliphatic hydrocarbons such as hexane. Rosins also have characteristically lower softening points, around 85° C. The resin employed in the make-up of the adhesive composition is predominantly of a phenolic nature containing substantial amounts of phlobaphenes, carboxyl-substituted phenols, hydroxy stilbenes and to a lesser extent other phenolic compounds such as the polyhydric phenols and lignin type materials. Rosin-derived material constitutes a lesser portion of the resin—around 25%—mostly in the form of stabilized resin acids with smaller amounts of the oxidized and polymerized resin acids. Hydrocarbon materials such as wax and polymerized terpenes customarily represent only a minor portion, about 10–15%. The resin prior to use in make-up of the adhesive should be in finely divided form, preferably pulverized to an extent that at least 90% passes through a standard 20-mesh sieve and 50% or more passes a standard 200-mesh sieve.

The butadiene-acrylonitrile copolymer employed in the present invention is a synthetic elastomeric material in which the amount of butadiene-1,3 in relation to the acrylonitrile polymerized is particularly important. In order to provide an adhesive for successfully bonding plastic sheet to fiberboard by radiant heat it has been found necessary to employ a butadiene-acrylonitrile copolymer composed of about 28–38% by weight acrylonitrile and 62–72% by weight butadiene. Compositions when prepared from copolymers containing more than about 38% acrylonitrile have been surprisingly found to completely fail in bonding of the plastic sheet to fiberboard under radiant heat conditions. Copolymers containing less than about 28% acrylonitrile do not give lasting high strength bonds when used in preparation of the adhesive composition. Best results are obtained when the butadiene-acrylonitrile copolymer is composed of about 32–36% by weight acrylonitrile and 64–68% by weight butadiene. In preparing the butadiene-acrylonitrile copolymer by conventional emulsion polymerization methods the use of the fatty acid derivatives and other grease-like substances commonly employed in the emulsion system is studiously avoided. It has been found that the retention in the polymerized product of the fatty acid soaps or other difficult to separate grease-like emulsifying agents will adversely affect the final adhesive composition such that a satisfactory bond fails to result between the plastic material and fiberboard under radiant heat conditions. The use of rosin-acid soaps and other similar rosin-acid derivatives also tends to adversely affect the adhesive composition and is desirably avoided in preparation of the copolymer. Preparation of the butadiene-acrylonitrile copolymer to be used in the adhesive composition of the invention is preferably accomplished by the use of the greaseless synthetic anionic or nonionic detergents as emulsifying agents. When so prepared there is the added advantage that the aqueous emulsion containing the polymerized butadiene-acrylonitrile product may be used directly in preparation of the adhesive with the emulsifying agent from the emulsion polymerization system being used at least in part to supply the emulsifying agent requirements for the adhesive composition. The molecular weight of the butadiene-acrylonitrile copolymer should preferably be between about 60 to 105, more desirably in the range of 75 to 100 as determined by Mooney plasticity (ML-4 at 212° F.). As employed in the adhesive composition the butadiene-acrylonitrile copolymer preferably should have an emulsion particle size between about 500–2500 Angstroms.

In providing an adhesive for the bonding of plastic film to fiberboard under radiant heat conditions it has been found that a small amount of plasticizer is necessary to obtain good results. Generally, the addition of a plasticizer to the composition was found to be necessary but also influenced several characteristics of the adhesive including not only bond strength but also heat stability, viscosity, thinning characteristics, and activation time and temperature. In the bonding of rigid, i.e. unplasticized, plastic film to fiberboard it was also found that the plasticizer must have a high degree of preference for the resinous components of the adhesive as against the heat-softened plastic film material to avoid plasticization of the film which causes a reduction in film strength and weakens the assembled product. It was found that liquid plasticizers were totally unsuitable for the purpose as well as most solid plasticizers which for one reason or another failed to give good results. In order to provide the required combination of properties for an adhesive in the bonding of plastic film to a fiberboard under high radiant heat conditions it has been found necessary to employ a small amount of about 15–30 parts per 100 parts based on the weight of the thermoplastic wood resin of a normally solid dicyclo-substituted phthalate plasticizer. The amount of plasticizer employed is at least as equally important as the type of plasticizer if satisfactory results are to be obtained. It was found that when the amount of the solid solid plasticizer exceeds about 30 parts a good initial bond may be obtained but the bond subsequently fails under ordinary humidity conditions. Below about 15 parts of plasticizer the adhesive composition becomes difficult to activate to the desired adhesiveness except under intensely high radiant heat well above the level which causes degradation of even the more stable rigid plastic films. The preferred amounts of solid dicyclo-substituted phthalate plasticizer within the range of about 17–22 parts per 100 parts of the thermoplastic natural resin give the best results and also particularly stable emulsion viscosities in the adhesive composition. Particularly excellent results have been found to be obtained when the solid plasticizer is diphenyl phthalate. Dicyclohexyl phthalate is an example of another dicyclo-substituted solid plasticizer which may be employed in make-up of the adhesive composition.

In the more preferred method of preparation of the adhesive composition the thermoplastic wood resin in the form of an emulsion is heated and the normally solid plasticizer in molten condition added to the heated emulsion. The emulsion at the time of addition should be heated to a temperature of about 70–80° C., or colsely approximating the temperature of the molten plasticizer during its addition. Temperature during addition of the plasticizer should generally not exceed about 90° C. to avoid breaking the emulsion. The thermoplastic wood resin in pulverized form is most advantageously emulsified with a material which acts as both an emulsifying agent and as a thickening agent for the final adhesive composition. The material particularly suitable for this purpose is a proteinaceous substance, desirably ammonium caseinate which may be obtained from the acid-coagulated caseins by treatment with aqueous ammonium hydroxide. The emulsion of the wood derived resin may be prepared by conventional methods by admixing acid-coagulated casein with aqueous ammonium hydroxide and sufficient water to constitute about one-third of the total water in the final emulsion. The mixture is then heated to abou 150° F., and wood derived resin, preferably in pulverized form, is added gradually with moderate agitation. After mixing at about 160–170° F. a short time, usually about 10 minutes, a small amount of warm water, usually about 10% by weight of the total water in the final emulsion, is slowly added while continuing agitation of the mixture. The balance of the water may be added slowly at room temperature to form the wood derived resin emulsion having a total solids content of about 40%. The amount of the combined emulsifying and thickening agent in the emulsion should not be in excess of about 15 parts per hundred parts of the wood resin, and preferably lies in the range of about 4 to 5 parts per hundred parts of the resin. Usually about 4.5 parts are required to be effective in forming a stable emulsion with the wood resin. Another material which may be employed as both emulsifying and thickening agent is ammoniated soya protein. It is customary when preparing the emulsion of the wood resin with ammonium caseinate to employ a slight excess of ammonium hydroxide. In preparing the emulsion for use in make-up of the adhesive composition of the invention the amount of ammonium hydroxide or other basic constituents should be controlled so that the pH of the adhesive composition will not exceed about pH 8.7 as above this level the composition tends to increase in viscosity to impractical levels. Generally, the pH of the adhesive composition when prepared from ammonium caseinate is at least about pH 8.0, and preferably is within the range of about pH 8.3 to pH 8.5. Th basic adhesive emulsion when prepared from the larger amounts of the dicyclo-substituted phthalate plasticizers from about 25–30 parts per hundred parts of the thermoplastic resin may occasionally exhibit a tendency to thin to the lower less desired viscosities. Viscosity control in such cases may be accomplished by addition of a suitable consistency stabilizing material such as ammonium alginate or ammonium polyacrylate. In preparing the adhesive the addition of the molten plasticizer to the wood resin emulsion is carried out slowly while subjecting the emulsion to high shear agitation to assure uniform distribution of the plasticizer. The addition of the molten plasticizer should take place over a period of at least about 5 minutes and preferably over a period of about 10 minutes. The addition may be accomplished continuously or by the intermittent addition of small amounts of the molten plasticizer. The high shear agitation used is that which will reduce the particle size of the molten plasticizer particles to a level which assures a stable mixture. The high shear agitation required is generally equivalent to that supplied by a 3″ diameter mixing blade at a speed of at least about 3000 r.p.m., preferably about 4000 r.p.m. After addition of the molten plasticizer, the emulsion is cooled to below about 35° C., preferably in a covered container. Cooling time should be less than about 4 hours, preferably about 2 hours. Such cooling of the plasticized emulsion to below 35° C., preferably to about a temperature of 20 to 30° C. has been found desirable in order to minimize the possibility of breaking the emulsion due to loss of water and ammonium hydroxide. During the cooling, the plasticized emulsion is maintained under moderate agitation to prevent formation of skin on the emulsion. After cooling it is preferred to allow the plasticized emulsion to stand for at least about two hours, preferably about 4 to 8 hours, to expel entrained air which has been found to be harmful in the mixture at this point because its inclusion in the final product tends to cause blowing in the adhesive when subjected to the high temperatures of the tile conditioning oven.

The adhesive composition of the invention is preferably formed by adding an aqueous emulsion of the butadiene-acrylonitrile copolymer to the plasticized emulsion containing the wood derivative resin. The addition is preferably carried out under mild agitation generally sufficient to admix the two emulsions while avoiding entrainment of air or coagulation. Both emulsions are preferably maintained at about room temperature although either emulsion at the time of addition may vary in temperature between about 10–35° C. The butadiene-acrylonitrile emulsion employed in make-up of the adhesive is preferably and conveniently that obtained directly from the manufacture of the copolymer by emulsion polymerization. In any case the emulsion should be free of the grease-like emulsifying agents which have been found to result in unsatisfactory bonding between fiberboard and plastic sheet material under radiant heat. The emulsifying agents preferably employed in the butadiene-acrylonitrile emulsion are the anionic and non-ionic synthetic detergents, desirably the anionic emulsifying agents such as sodium naphthalene sulfonate, sodium isopropyl naphthalene sulfonate and sodium di-isobutyl naphthalene sulfonate. The emulsifying agent employed in make-up of the butadiene-acrylonitrile emulsion should constitute from about 1% to about 5% by weight based on the solids content of the emulsion and about 0.5% to about 3% by weight based on the solids content of the total adhesive composition. Preferably, the emulsifying agents employed in the butadiene-acrylonitrile emulsion constitute about 2 to 4% by weight of the solids content of the emulsion and about 1.3 to 2.7% by weight of the total adhesive composition. The solids content of the butadiene-acrylonitrile emulsion may vary fairly widely as employed in preparation of the adhesive composition and generally lies within the range of about 40% to about 60% to provide an adhesive composition having a solids content between 42% to 55% by weight. The butadiene-acrylonitrile emulsion preferably has a solids content of about 50 to 55% by weight while the adhesive compositions giving the best results have a solids content between about 48 to 52% by weight. After addition of the emulsion of the butadiene-acrylonitrile copolymer agitation at slow speed is preferably continued until the compositions are thoroughly admixed, usually for a period of at least, about 2 minutes, preferably between 5–15 minutes.

In the manufacture of plastic film covered fiberboard products by vacuum-forming methods employing radiant heat only small amounts of the adhesive composition of the present invention need be used to obtain a strong, durable bond. The adhesive composition of the invention may applied to the fiberboard by conventional methods such as bevel coating wheels or, preferably, extrusion from controlled flow nozzles. The adhesive composition in the form of an aqueous emulsion has the additional particularly desirable feature of being able to undergo substantial dehydration at elevated temperatures to the point where the composition is substantially anhydrous. Such removal of water from the adhesive composition by heating does not result in loss or depreciation of bonding capacitiy on subsequent reheating to activation temperatures even after cooling to ambient temperatures. In fact, in obtaining best results in the bonding of plastic film to fiberboard by radiant heat and vacuum forming it is usually required to dehydrate the adhesive emulsion to a water content less than about 1½% by the total weight. In producing the plastic film covered fiberboard products by vacuum-forming methods the adhesive emulsion is therefore preferably and conveniently applied to the fiberboard body prior to the heat conditioning operation and both the fiberboard and the adhesive composition dehydrated in the conditioning oven. When the adhesive is so applied to the fiberboard the conditioning operation may be carried out in the conventional manner by passing the edge coated fiberboard through the oven at a temperature of about 250–500° F., more generally between about 350° F. to 400° F. Heating time in the conditioning oven may vary over a period of about 5 to 20 minutes and is desirably controlled to reduce the water content of the adhesive to about 0 to 1% by total weight over a drying period of about 10 minutes. Ater the conditioning operation the adhesive, when originally applied as a ribbon or bead in emulsion form, is converted to a rubber-like film or band on the fiberboard and is heat-activatable to form a strong bond either immediately after the conditioning operation or after cooling to ambient temperatures.

The adhesive composition of the invention may be used in vacuum and radiant heat forming operations to bond plastic film to a porous fiberboard body composed of any suitable fibrous material including the cellulosic fibers such as wood fiber and the mineral fibers such as glass and asbestos fibers. The thin plastic sheet or film to be bonded to the fiberboard body under radiant heat conditions should be of the rigid type, i.e. containing little or no plasticizer. Rigid polyvinyl chloride film material is well suited for vacuum forming under radiant heat conditions. Other film materials which may be employed include polyethylene, chlorinated polyethylene, vinylidene chloride-acrylonitrile polymers, vinyl fluoride polymers and acrylic polymers. The fiberboard body to be covered in the heat and vacuum forming methods usually has at least one substantially planar surface with thickness substantially less in dimension than the surface. The planar surface of the fiberboard which is preferably the one to be covered may be that which is normally exposed and may be fissured or perforated as is commonly the case with the normally exposed surfaces of the acoustical ceiling tiles. The fiberboard body is generally of polygonal configuration with the normally exposed surface terminating at marginal side-edges which may be perpendicular to the surface of the fiberboard body or beveled downwardly away from such surfaces as is conventional in the case of acoustical ceiling tiles and other interior panelling. The wide edges of the fiberboard body may be slotted or equipped with tongue or groove joints or other means for assembling the fiberboards. As the adhesive composition of the invention is particularly effective only a small continuous band of the adhesive composition disposed preferably at the marginal edges of the fiberboard body need be used to form a strong durable bond. In the manufacture of plastic film covered acoustical tiles to which the invention in its more preferred aspects is directed the adhesive composition is preferably disposed as a narrow continuous band on the beveled side-edges of the fiberboard base. The amount of adhesive employed in such cases need be only about 0.15 to 0.65 gram per inch of edge surface, preferably about 0.20 gram per inch of edge surface. When used in the manufacture of plastic film covered tiles by vacuum forming methods employing radiant heat such small amounts of the adhesive produce a bond which is not only of high strength and lasting resistance but also a bond which withstands stress exerted by the plastic film when the fiberboard expands under high temperature, high humidity conditions. The plastic film covered tiles so produced with the adhesive of the invention are particularly outstanding in their ability to produce a bond which is sustained under the most extreme temperature and humidity conditions created by moisture, light fixtures, radiators and others heating producing outlets which have caused failure of bonds produced by other adhesive materials in the same applications. While the adhesive composition of the invention is particularly suited for bonding of thin plastic sheet or film to fiberboard under high radiant heat conditions it will be evident that the composition may be used in the bonding of a wide variety of other materials including paper, wood masonry, metal, urethane foam, foamed polystyrene, plasticized vinyl film, and natural and synthetic fiber articles. The adhesive composition is also heat activatable by other than radiant heat means and may also be used in the above applications in either emulsion or dry form as a wet-stick, contact or heat-activable adhesive.

The following examples demonstrate the practice and the advantages of the invention:

*Example 1*

Into a stainless steel mixer container of 5 gallons capacity there was charged 9.0 kilograms of an aqueous emulsion of a pulverized southern pine wood resin having a softening point by ASTM ring and ball of about 108–112° C. The emulsion contained about 40% total solids of which about 3.45 kilograms was the pine wood resin and about 150 grams ammonium caseinate. The emulsion had a pH of about 8.4. The pine wood resin was available under the trade name "Vinsol" and was obtained in the emulsion form from the manufacturer, Hercules Powder Company. The resin emulsion was heated in the mixing container to a temperature of about 73° C. while maintained under moderate agitation with a high shear propeller attached to a variable speed motor. The propeller was about three inches in diameter with agitation being conducted at a motor speed of 1500 r.p.m. The mixing device employed was a Cowles dissolver, Model No. 1–VT. Heating of the emulsion in the mixing container was carried out by means of an electric hot plate. Simultaneously, about 800 grams of solid crystalline diphenyl phthalate was heated above its crystalline melting point in a separate weighed container to a temperature of about 73° C. The heat source was removed from the pine wood resin emulsion and a total of 720 grams of molten diphenyl phthalate slowly added to the heated emulsion over a period of about ten minutes. The diphenyl phthalate was maintained at a temperature above about 70° C. during the addition period by intermediate heating on the hot plate. During addition of the molten diphenyl phthalate, the emulsion was maintained under high shear rapid agitation by increasing the speed of the propeller to 4000 r.p.m. Immediately after addition of the diphenyl phthlate the plasticized emulsion was cooled to about 30° C. over the course of about 45 minutes by immersing the mixing vessel in cold water. During cooling, the plasticized emulsion was maintained under moderate agitation to prevent skin formation on the emulsion by reducing the speed of the propeller to about 1500 r.p.m. After cooling the steel mixing container was covered and the plasticized emulsion permitted to stand at about room temperature for about 2 hours to allow any entrained air to be expelled from the emulsion. The plasticized pine wood resin emulsion had a total solids content of about 44.5%. About 9.36 kilograms of this material was then charged into the mixing bowl of a slow speed planetary paddle-type mixer having a working capacity of about six gallons. The metal paddle blades of the mixer were covered with sheet rubber which projected slightly beyond the edges of each of the paddle blades to permit a gentle scraping action on the sides of the container. The emulsion was then placed under very slow agitation by means of a "Variac" to control the speed of the shaft at about 30 r.p.m. There was then added to the plasticized emulsion a total of about 16.02 kilograms of an aqueous emulsion latex obtained from the B. F. Goodrich Chemical Company as "Hycar" Latex 1552. The latex had a solids content of about 53% and contained about 8.25 kilograms of a rubbery butadiene-acrylonitrile copolymer composed of about 32–34% by weight acrylonitrile and about 66–68% by weight butadiene. The remaining solids content of the latex was about 240 grams of an anionic synthetic emulsifying agent in the presence of which the copolymer was prepared. The latex was added gradually to the plasticized emulsion over a period of about 2 minutes and after addition agitation was continued for about 5 minutes to assure thorough blending of the emulsion system. The resulting mixed emulsion was then transferred to a closed, epoxy-lined container for storage prior to use.

The final product was a buttery thixotropic brown emulsion having a pH of about pH 8.4 and an initial viscosity of about 3000 centipoises at 23° C.

Vinyl film covered acoustical tiles were prepared employing the above-prepared adhesive and subjected to bond strength testing and accelerated humidity testing to demonstrate the superiority of the adhesive composition of the invention in the manufacture of such products at high temperatures. Two plastic film covered tiles were produced separately on a laboratory size vacuum forming apparatus having a perforated vacuum plate surrounded by a lower stationary frame and a correspondingly similar upper vertically adjustable clamping frame. The frames defined a vacuum area having dimensions of 14 inches x 14 inches. A radiant heater adapted to provide varying heat up to temperatures of about 1700° F. was located about 5 inches directly above the vacuum plate. There was then disposed on the vacuum plate a fiberboard ceiling tile having a $11^{11}/_{16}$ inches x $11^{11}/_{16}$ inches normally exposed perforated surface terminating at edges having a width of about $3/_{16}$ inch while the overall dimensions of the tile measured about $12^{5}/_{8}$ inches x $12^{5}/_{8}$ inches. A sheet of embossed polyvinyl chloride film of about 2 mils thickness was then disposed over the tile face and secured between the frames. On the beveled edges of the tile there had been disposed a continuous bead of the adhesive material prepared above. The amount of adhesive applied was equivalent to about 0.20 gram per inch along the beveled edges of the tile. Prior to placing the tile in the vacuum forming apparatus the tile with the adhesive applied to its beveled edges had been conditioned in a drying oven at a temperature of about 375° F. for about 10 minutes. After positioning the tile on the vacuum plate a flat metal shield adapted to cover the entirety of the normally exposed tile face but leaving the beveled edges uncovered was positioned over the vinyl film. The radiant heater was then pulled to position above the tile and the exposed film and underlying adhesive haeted briefly for about 2 seconds at a heater temperature of about 1700° F. to soften the plastic film. Vacuum equivalent to about 28 inches of mercury was then applied to draw the film securely against the adhesive heated briefly for about 2 seconds at a heater temof the tile. Heating was continued for an additional 10 seconds to complete activation of the adhesive between the fiberboard tile and the plastic film. The heater was then pulled back from over the covered tile assembly and the vacuum released. The adhesive set to a strong bond almost instantly after removal of the radiant heat source. The tile assembly was then removed from between the frames and immediately rough trimmed to remove most of the excess plastic film at the tile edges.

One of the vinyl film covered tiles was subjected to a hot water vapor impingement test to determine primarily the resistance of the adhesive bond to water vapor and heat. The plastic film covering the fiberboard tile face was divided by cutting diagonally from corner to corner. One section of the divided film was separated from the fiberboard tile and the glue lines fully exposed on the remaining section. With the exposed glue lines downwardly disposed the tile was vertically suspended above boiling water with the glue lines about 3 inches from the water level. The tile was allowed to remain suspended above the boiling water for 15 minutes after which the bond between the tile and the vinyl film was examined. In evaluating the hot water impingement test the retention of a strong bond after 5 minutes showed that the adhesive was satisfactory while ability to retain bond strength after 15 minutes demonstrated a particularly excellent adhesive. The vinyl film bonded to the fiberboard tile base by the adhesive prepared as above described was found after the 15 minute impingement test to be substantially unaffected and retained substantially the bonding strength of the original bond when it was attempted to remove the vinyl film from the tile.

The second of the two vinyl covered tile assemblies was subjected to an accelerated test to determine primarily bond strength under high temperature, high humidity conditions. On one side of the tile assembly there was cut a 1″ wide strip about 6″ long with the cutting being made deep into the fiberboard at the glue lines to ensure complete separation of the glue line underlying the 1″ strip from the glue lines adjacent to the strip. A 1000 gram weight was then attached to the free end of the strip of vinyl film. With the 1000 gram weight suspended from the free end of the 1″ strip to place the glue line unlerlying the strip under tension the tile was mounted vertically in an oven adjusted to maintain a temperature of 100° F. and 90% relative humidity. During about an 8 hour span the tile was frequently examined for durability of the 1″ wide bonded area. In evaluating the accelerated high temperature humidity test the retention of bond for about 6 hours showed that the adhesive was acceptable while retention of bond after the 8 hour test period demonstrated superior bonding. After more than 62 hours in the high temperature, high humidity test no weakening or movement of the bond produced by the adhesive of the present invention was found.

*Example 2*

An aqueous adhesive emulsion which thinned on application of shearing forces was prepared similar to that in Example 1 except that 720 grams of normally solid dicyclohexyl phthalate was employed as plasticizer in substitution for the diphenyl phthalate.

Ceiling tiles prepared the same as in Example 1 were subjected to the same tests described in that example. The tiles bonded with the adhesive emulsion containing the dicyclohexyl phthalate showed excellent strength when tested at room temperature but showed deterioration of the bond after less than 10 minutes in the hot water vapor test. Tile bonded with this adhesive passed the high temperature-humidity test by sustaining the test conditions for more than 8 hours before weakening of the bond was observed. It was concluded that the dicyclohexyl phthalate plasticizer could be successfully used in the adhesive composition although a comparison with the results obtained with diphenyl phthalate indicated that the diphenyl phthalate was superior.

The following examples made for comparative purposes illustrate the importance of employing the correct proportions and ingredients in make-up of the adhesive composition of the invention.

*Example 3*

An aqueous adhesive emulsion which thinned on application of shearing forces was prepared similar to that in Example 1 except that the butadiene-acrylonitrile copolymer was composed of about 41–43% by weight acrylonitrile and 67–69% by weight butadiene. The copolymer was obtained in aqueous emulsion as "Hycar Latex 1551" from the B. F. Goodrich Chemical Co. The latex contained about 53% total solids and utilized an anionic synthetic detergent as the emulsifying agent.

Ceiling tile prepared by radiant heat vacuum forming the same as in Example 1 were subjected to the same tests described in that example. The tiles bonded with the adhesive composition containing the butadiene-acrylonitrile copolymer of higher acryolnitrile content completely failed to pass the hot water vapor test with the bond failing after about 2 minutes.

*Example 4*

An adhesive emulsion which thinned on application of shearing forces was prepared similar to that in Example 1 except that 720 grams of normally solid triphenyl phosphate was employed as plasticizer in substitution for the diphenyl phthalate.

When preparing ceiling tiles by the same radiant heat vacuum forming operation employed in Example 1 using the adhesive composition containing the triphenyl phosphate it was found that a poor bonding resulted indicating the complete lack of suitability of solid triphenyl phosphate as a plasticizer in the adhesive composition.

Although cetrain preferred embodiments of the invention have been disclosed for purpose of illustration, it will be evident that various changes and modifications may be made therein without departing from the scope and spirit of the invention.

I claim:

1. A heat-activatable adhesive composition substantially non-tacky at room temperature comprising in aqueous emulsion about 100 parts by weight of a natural thermoplastic resin derived from hardwood and having a softening point by ASTM ring and ball of at least 100° C.; about 200–300 parts by weight of a rubbery synthetic butadiene acrylonitrile copolymer composed of 28–38% by weight acrylonitrile and 62–72% by weight butadiene; about 15 parts to less than 30 parts by weight of normally solid dicyclo-substituted phthalate; and up to about 20 parts by weight of a greaseless synthetic detergent as emulsifying agent; said adhesive emulsion characterized by thinning on application of shearing forces.

2. The adhesive composition of claim 1 in which the dicyclo-substituted phthalate is diphenyl phthalate.

3. A heat-activatable adhesive composition substantially non-tacky at room temperature comprising in aqueous emulsion about 100 parts by weight of a natural thermoplastic resin derived from pine wood and having a softening point by ASTM ring and ball of at least 100° C.; about 230–270 parts by weight of a rubbery synthetic butadiene acrylonitrile copolymer composed of 32–36% by weight acrylonitrile and 64–68% by weight butadiene; about 17 to 22 parts by weight of diphenyl phthalate and about 1 to 6 parts by weight of a greaseless anionic synthetic detergent; said adhesive emulsion characterized by thinning on application of shearing forces.

4. A high heat-activatable adhesive composition substantially non-tacky at room temperature comprising in aqueous emulsion about 100 parts by weight of a natural thermoplastic resin derived from hardwood and having a softening point by ASTM ring and ball of at least 100° C.; about 200–300 parts by weight of a rubbery synthetic butadiene acrylonitrile copolymer composed of 28–38% by weight acrylonitrile and 62–72% by weight butadiene; about 15 parts to less than 30 parts by weight of normally solid dicyclo-substituted phthalate; up to about 20 parts by weight of a greaseless emulsifying agent selected from the group consisting of anionic and non-ionic synthetic detergents; and up to about 15 parts by weight of a proteinaceous material as thickener for said adhesive emulsion; said adhesive composition having a viscosity between 1000 to 6000 centipoises at 23° C. and characterized by thinning on application of shearing forces.

5. A high heat-activatable adhesive composition substantially non-tacky at room temperature comprising in aqueous emulsion about 100 parts by weight of a natural thermoplastic resin derived from hardwood and having a softening point by ASTM ring and ball of at least 100° C.; about 200–300 parts by weight of a rubbery synthetic butadiene acrylonitrile copolymer composed of 28–38% by weight acrylonitrile and 62–72% by weight butadiene; about 15 parts to less than 30 parts by weight of normally solid diphenyl phthalate; up to about 20 parts by weight of greaseless emulsifying agent selected from the group consisting of anionic and non-ionic synthetic detergents; up to about 15 parts by weight of an ammonium caseinate as thickener for said adhesive emulsion; said adhesive composition having a pH less than about 8.7, a viscosity between about 1000 to 6000 centipoises at 23° C. and characterized by thinning on application of shearing forces.

6. A high heat-activatable adhesive composition substantially non-tacky at room temperature comprising in aqueous emulsion about 100 parts by weight of a finely divided thermoplastic natural resin derived from pine wood and having a softening point by ASTM ring and ball of 105–125° C.; about 230–270 parts by weight of a rubbery synthetic butadiene-acrylonitrile copolymer composed of 32–36% by weight acrylonitrile and 64–68% by weight butadiene; about 17–22 parts by weight of diphenyl phthalate; between about 1 to 6 parts by weight of a greaseless anionic synthetic emulsifying agent; and between about 4 to 5 parts by weight of ammonium caseinate as thickener for said adhesive emulsion; said adhesive composition having a pH between about pH 8.3 to pH 8.5, a viscosity between 2000 to 4000 centipoises at 23° C. and characterized by thinning on the application of shearing forces.

7. Plastic sheet covered fiberboard composed of a porous fiberboard body having a substantially planar surface terminating at marginal edges providing a generally polygonal configuration and having a thickness substantially less in dimension than the dimensions of said surface; a thin sheet of rigid synthetic plastic material covering said surface and heat formed over the marginal edges of the fiberboard; said plastic sheet bonded to said fiberboard body by an adhesive material which comprises about 100 parts by weight of a natural thermoplastic resin derived from hardwood and having a softening point by ASTM ring and ball of at least 100° C.; about 200–300 parts by weight of a rubbery synthetic butadiene acrylonitrile copolymer composed of 28–38% by weight acrylonitrile and 62–72% by weight butadiene; about 15 parts to less than 30 parts by weight of normally solid dicyclo-substituted phthalate; and up to about 20 parts by weight of a greaseless synthetic detergent or emulsifying agent, said plastic sheet material being lastingly bonded to the fiberboard body by reason of said adhesive.

8. A plastic sheet covered acoustical ceiling tile composed of a porous fiberboard body having a substantially planar normally exposed acoustical perforated surface terminating at marginal edges providing a generally rectilinear configuration and thickness substantially less in dimension than the dimension of said surface; a thin sheet of rigid synthetic platsic material covering said surface and heat formed over the marginal edges of the fiberboard body; said plastic sheet material bonded at the marginal edges to the fiberboard body by an adhesive material comprising about 100 parts by weight of a natural thermoplastic resin derived from hardwood and having a softening point by ASTM ring and ball of at least 100° C.; about 200–300 parts by weight of a rubbery synthetic butadiene acrylonitrile and 62–72% by weight butadiene; about 15 parts to less than 30 parts by weight of normally solid dicyclo-substituted phthalate; and up to about 20 parts by weight of a greaseless synthetic detergent as emulsifying agent, said plastic sheet material being lastingly bonded to the fiberboard body by reason of said adhesive.

9. The plastic sheet covered acoustical ceiling tile of claim 8 in which the fiberboard body is comprised of cellulosic fibers and the normally exposed surfaces terminating at narrow side edges beveled downwardly and away from said surface, and in which the adhesive material is disposed as a continuous band on said beveled side edges and is composed of about 100 parts by weight of natural thermoplastic resin derived from pine wood and having a softening point by ASTM ring and ball of at least 100° C.; about 230–270 parts by weight of a rubbery synthetic butadiene acrylonitrile copolymer composed of 28–38% by weight acrylonitrile and 62–72% butadiene; about 15 parts to less than 30 parts by weight of diphenyl phthalate; and about 1 to 6 parts by weight of a greaseless anionic synthetic detergent.

10. In the method of manufacture of plastic sheet covered fiberboard by the application of heat and vacuum pressure to bond and heat-form plastic sheet material to a fiberboard body to which a heat-activatable adhesive has been applied; the improvement which comprises employing therein as adhesive an aqueous emulsion containing about 100 parts by weight of a natural thermoplastic resin derived from hardwood and having a softening point by ASTM ring and ball of at least 100° C.; about 200–300 parts by weight of a rubber synthetic butadiene acrylonitrile copolymer composed of 28–38% by weight acrylonitrile and 62–72% by weight butadiene; about 15 parts to less than 30 parts by weight of normally solid dicyclo-substituted phthalate; and up to about 20 parts by weight of a greaseless synthetic detergent as emulsifying agent; said adhesive emulsion having a viscosity of about 1000 to 6000 centipoises at 23° C. and characterized by thinning on application of shearing forces.

11. The method of claim 10 in which the fiberboard body has a substantially planar surface terminating at marginal edges providing a general polygonal configuration and thickness substantially less in dimension than the dimensions of said surface, the adhesive material is disposed as a narrow bead at the marginal edges of the fiberboard body, the normally solid dicyclo-substituted phthalate is dipenyl phthalate, the plastic sheet material covering said surface and said bead of adhesive material, and in which radiant heat is directed to at least that portion of the plastic sheet overlying the adhesive to soften the plastic sheet and activate the adhesive.

12. In the method of manufacture of plastic sheet covered fiberboard by the application of heat and vacuum pressure to bond and heat-form plastic sheet material to a fiberboard body to which a heat-activatable adhesive has been applied; the improvement which comprises applying the adhesive in aqueous emulsion form to said fiberboard body and thereafter subjecting said fiberboard and adhesive to elevated temperature to reduce the water content of said adhesive to less than about 1.5% by total weight, said adhesive comprising in aqueous emulsion about 100 parts by weight of a natural thermoplastic resin derived from hardwood and having a softening point by ASTM ring and ball of at least 100° C.; about 200–300 parts by weight of a rubbery synthetic butadiene acrylonitrile copolymer composed of 28–38% by weight acrylonitrile and 62–72% by weight butadiene; about 15 parts to less than 30 parts by weight of normally solid dicyclo-substituted phthalate; and up to about 20 parts by weight of a greaseless emulsifying agent selected from the group consisting of anionic and non-ionic synthetic detergents; said adhesive emulsion having a viscosity of about 1000 to 6000 centipoises at 23° C. and characterized by thinning on application of shearing forces.

13. The method of claim 12 in which the fiberboard body has a substantially planar surface terminating at marginal edges providing a generally polygonal configuration and thickness substantially less in dimension than the dimension of said surface, the adhesive material is disposed as a narrow bead at the marginal edges of the fiberboard body, the fiberboard body and adhesive subjected to temperature within the range of about 250° C. to 500° C. for a period from about 5 minutes to 20 minutes to reduce the water content of the adhesive to between about 0 to 1% by weight and form an adhesive film at the marginal edges, the plastic sheet material covering said surface and said film of adhesive material, and in which radiant heat is directed to at least that portion of the plastic sheet overlying the adhesive to soften the plastic sheet and activate the adhesive.

14. In the manufacture of plastic sheet covered fiberboard comprising applying an adhesive to a fiberboard body, subjecting said fiberboard body to elevated temperatures to reduce the moisture content of the fiberboard, then disposing a thin sheet of plastic material over at least that portion of the fiberboard body which includes said adhesive, clamping a peripheral portion of said plastic sheet to form a gas-tight closure between the respective sides of said plastic sheet, subjecting at least that portion of the plastic sheet overlying the adhesive material to radiant heat to soften said plastic sheet, applying vacuum to said softened plastic sheet to draw the sheet to the fiberboard body, continuing the application of radiant heat for time at least sufficient to activate said adhesive, and thereafter cooling said plastic sheet and adhesive while maintaining vacuum pressure to bond said plastic sheet to said fiberboard body; the improvement which comprises employing therein adhesive composition comprising in aqueous emulsion about 100 parts by weight of a natural thermoplatsic resin derived from hardwood and having a softening point by ASTM ring and ball of at least 100° C.; about 200–300 parts by weight of a rubbery synthetic butadiene acrylonitrile copolymer composed of 28–38% by weight acrylonitrile and 62–72% by weight butadiene; about 15 parts to less than 30 parts by weight of normally solid dicyclo-substituted phthalate; and up to about 20 parts by weight of a greaseless emulsifying agent selected from the group consisting of anionic and non-ionic synthetic detergents; said adhesive emulsion having a viscosity of about 1000 to 6000 centipoises at 23° C. and characterized by thinning on application of shearing forces, said adhesive material being applied to the fiberboard body prior to heating of the fiberboard to reduce moisture content so that both fiberboard and adhesive material are subjected to elevated temperature whereby the water content of the adhesive is reduced to less than about 1.5% by total weight and the adhesive disposed on the fiberboard as a film.

15. In the manufacture of plastic sheet covered fiberboard comprising applying an adhesive to a fiberboard body, subjecting said fiberboard body to elevated temperatures to reduce the moisture content of the fiberboard, then disposing a thin sheet of plastic material over at least that portion of the fiberboard body which includes said adhesive, clamping a peripheral portion of said plastic sheet to form a gas-tight closure between the respective sides of said plastic sheet, subjecting at least that portion of the plastic sheet overlying the adhesive material to radiant heat to soften said plastic sheet, applying vacuum to said softened plastic sheet to draw the sheet to the fiberboard body, continuing the application of radiant heat for time at least sufficient to activate said adhesive and, thereafter cooling said plastic sheet and adhesive while maintaining vacuum pressure to bond said plastic sheet to said fiberboard body; the improvement which comprises employing therein adhesive composition comprising in aqueous emulsion about 100 parts by weight of natural thermoplastic resin derived from pine wood and having a softening point by ASTM ring and ball of at least 100° C.; about 230–270 parts by weight of a rubbery synthetic butadiene acrylonitrile copolymer composed of 28–38% by weight acrylonitrile and 62–72% butadiene; about 15 parts to less than 30 parts by weight of diphenyl phthalate; and about 1 to 6 parts by weight of a greaseless anionic synthetic detergent, said adhesive material being applied to the fiberboard body prior to heating of the fiberboard to reduce moisture content so that both fiberboard and adhesive material are subjected to elevated temperature whereby the water content of the adhesive is reduced to less than about 1.5% by total weight and the adhesive disposed on the fiberboard as a film.

16. The method of claim 15 in which the fiberboard body has a substantially planar surface terminating at marginal edges providing a generally polygonal configuration and thickness substantially less in dimension than the dimensions of said surface and in which the adhesive material in emulsion form is disposed as a narrow bead at the marginal edges of the fiberboard body.

17. The method of claim 16 in which the planar surface of the fiberboard body has acoustical perforations and the plastic sheet material covering said surface is shielded over essentially the entire area of said surface leaving the plastic sheet overlying the adhesive material unshielded.

18. The method of claim 17 in which the planar surface of the fiberboard body terminates at edges beveled downwardly and away from said surface, the adhesive material being applied as a narrow continuous band on said beveled edges, and in which the adhesive composition contains up to about 15 parts by weight ammonium caseinate as thickener for said adhesive, said adhesive emulsion having a pH less than about pH 8.7.

References Cited by the Examiner
UNITED STATES PATENTS

| | | |
|---|---|---|
| 2,430,934 | 11/1947 | Kemmler et al. |
| 2,550,834 | 5/1951 | MacDonald et al. _____ 260—8 |
| 2,736,679 | 2/1956 | Nickerson _____ 260—27 |
| 2,746,885 | 5/1956 | Holt _____ 260—29.7 |
| 2,772,970 | 12/1956 | Feigley _____ 260—29.7 |
| 2,802,764 | 8/1957 | Slayter et al. |
| 2,806,812 | 9/1957 | Merz. |
| 2,880,184 | 3/1959 | Groves et al. _____ 260—29.7 |
| 3,103,858 | 9/1963 | Lauren _____ 260—29.7 X |

FOREIGN PATENTS 123,758  6/1945  Australia.

ALEXANDER WYMAN, *Primary Examiner.*

MORRIS SUSSMAN, EARL M. BERGERT, *Examiners.*